Dec. 27, 1927.  
V. TOBOLLA  
1,653,791  
BELT HOOK LACING  
Filed Feb. 17, 1927

INVENTOR.
Victor Tobolla
BY Myron J. Dikeman
ATTORNEY.

Patented Dec. 27, 1927.

1,653,791

UNITED STATES PATENT OFFICE.

VICTOR TOBOLLA, OF CHICAGO, ILLINOIS.

BELT-HOOK LACING.

Application filed February 17, 1927. Serial No. 169,092.

The object of my invention is to produce a belt lacing, comprising a series of lacing hooks, so assembled and combined as to be capable of being inserted within belt sections for splicing and joining the belt ends together for the purpose of making a continuous belt section.

Another object is to produce a belt hook lacing, comprising a series of wire belt hooks assembled in a permanent form, capable of being used for joining belt ends without the requirement of a special belt hook machine, as is ordinarily required with the various types of wire belt hooks now on the market.

A further object is to produce belt hook lacing, comprising a series of wire belt hooks assembled in a rigid metal frame and in such a manner that the frame becomes a part of the lacing section itself and remains rigidly and fixedly attached to all of the lacing hooks.

A still further object is to produce a belt hook lacing in sections formed of series of steel wire belt hooks combined by rigid bar members, fixedly attached to each arm of the wire hooks and which remains thereon as a permanent member for the purpose of producing a lacing hook, capable of being inserted without the aid of a machine for the purpose of holding each wire hook section in a rigid fixed position at all times.

These several objects are attained in the preferred form by the construction and arrangement of parts, more fully hereinafter set forth.

Similar parts on all drawings are marked by similar numerals.

Figure 3:
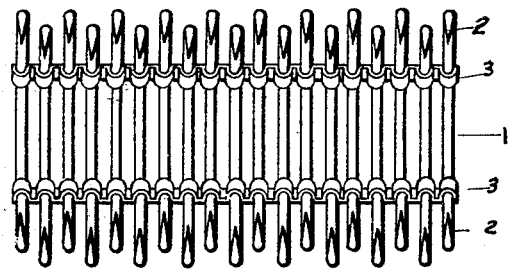
Fig. 3, is a top view of the section shown in Fig. 1, which illustrates the alternate placing of the long and short arms of the hook.

I will now describe more fully the detail construction of my device, referring to the drawings and the marks thereon.

It is known that several types of wire belt hooks prepared for lacing belts are now manufactured and are on the market, but in each of these cases the lacings comprise a series of loosely mounted hooks only and are applicable only through the use of special belt hook machines, while my invention comprises a further improvement and is adapted for application either with or without the use of a belt hook machine.

Figure 1:
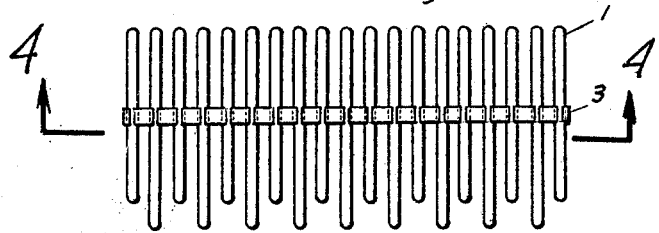
Fig. 1, is a side view of an assembled section of the wire hook lacing, showing the relative position of the hooks and the attached lacing bars.
Figure 2:
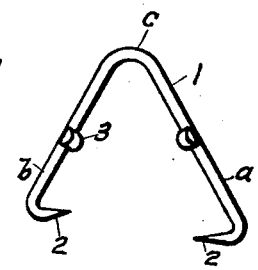
Fig. 2, is an end view of the assembled section shown in Fig. 1, showing the form of lacing hook used therein, and the relative position of the lacing bars attached thereto.
Figures 4, 5:
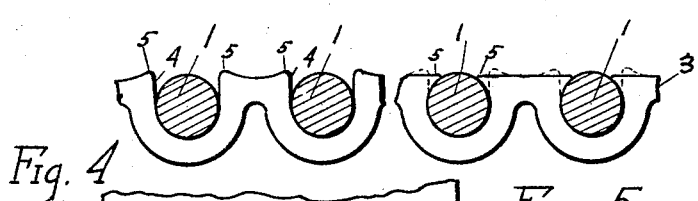
Fig. 4, is an enlarged detail taken on line 4—4 of Fig. 1, showing a section of the lacing bar as formed for attaching to the wire hook sections.
Fig. 5, is also an enlarged detail section taken on line 4—4 of Fig. 1, and shows the means of attaching the lacing bar to the wire hooks.
Figure 6:
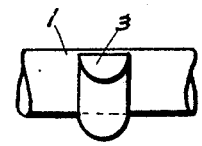
Fig. 6, is an end view of the lacing bar as shown in Fig. 5.

In assembling my belt lacing I use a standard form of belt hook —1— made of a fine steel wire formed into a V-shaped member, preferably shaped with a curved apex —c—, and having both ends sharpened to a point and bent inwardly forming short sharp end hooks —2— at the end of each of the arms —a— and —b—. It is desired and found to be the general practice in making wire belt hooks to form the same having one arm shorter than the other and for positioning the hook points —2— so as to enter the belt material in which they are inserted at different places, thus avoiding unnecessary injury to the belt material and providing two points of contact therein instead of one, which greatly increases the resistancy of the belt to the belt hook load. These wire belt hooks —1— are then placed in series by alternately placing a long and short hook arm on each side of the series which accomplish the alternate punching of the belt material when the hooks are inserted therein, the series of wire points being arranged as clearly illustrated in Figs. 1 and 3. The wire hooks —1— are positioned parallel with each other and placed within the series, having the curved end —c— positioned in a straight line and the arms of all of the hooks positioned in the same planes forming a V-shaped section member thereby. The wire hook sections are preferably spaced a sufficient distance apart for alternating inserting hook sections therebetween and intervening two lacing sections together. Fixedly attached to the under side of each of the arms —a— and —b— is a metal lacing bar —3— which extends the entire length of the series of wire lacing hooks —1—, and is fixedly attached to each arm of the hooks. The lacing bar —3— is preferably made of a semi-circular wire section bent and formed with the flat surface thereof to fit and engage a portion of the wire hook sections and formed in a series of U-shaped sections —4— for partly engaging the wire of the hook —1— therein. The U-sections —4— are formed of a depth slightly more than the diameter of the wire hook —1—, and are pressed and shaped with the prongs —5— projecting therefrom, and in a manner which when placed within the machine die may be pressed and bent over the wire hook —1—, fixedly attaching the lacing bar to each wire hook section and rigidly holding the hook sections in a fixed position, all alternately arranged and parallel to each other. The lacing bar —3— is of a design capable of being formed and shaped in the U-sections by die operations and the assembling of the lacing clip is completed by placing the hooks in a frame and clamping the lacing member thereon, by the operation of a closing die and bending the prongs —5— over the wire.

It will be noted that in the finished clip the lacing bar —3— is positioned slightly below the outer surface of the wire hooks and retains a smooth outer surface as usually placed with the ordinary belt hook sections. By the application of a lacing bar —3— to each of the arms —a— and —b— of the wire hook —1—, each hook is held in a rigid fixed position, which enables the section to be easily placed within a belt lacing machine for clamping and engaging the ends of the belt members, or, by the rigid construction the section may be inserted within the belt by the use and application of an anvil and hammer, and the hook sections may be inserted effectively and accurately, even without the use of special belt clamping machinery. The lacing bar —3— is positioned along the arms —a— and —b— of the hook, at a distance from the end hooks —2— to allow the bars —3— to come adjacent to the end of the belt section —7—, when attached thereto, and at a sufficient distance from the curved apex —c— of the hook to avoid interference with the ends of the alternate series of sections when two sections are assembled together.

Figure 7:
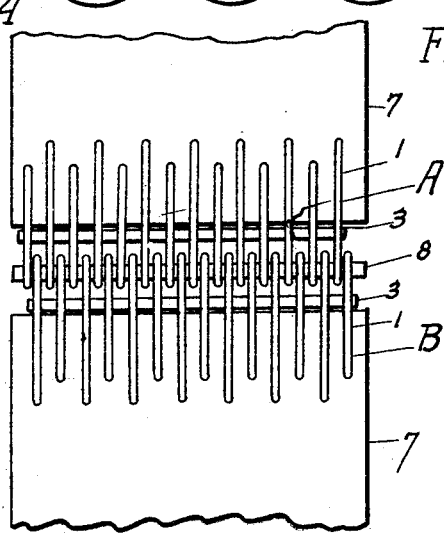
Fig. 7, is an illustration, showing my belt hook lacing as applied to the ends of a belt by joining the two ends together.
Figure 8:
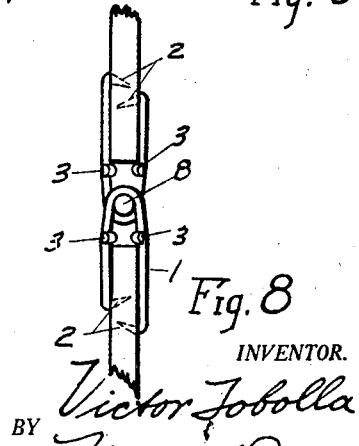
Fig. 8, is a side view of the belt connection as shown in Fig. 7, and shows the relative position of the lacing sections thereon.

In applying my invention to a belt section —A— is positioned over the end of the belt section —7— and the hook points —2— engaging either side of the belt placed thereon to position the lacing bar —3— adjacent to the end of the belt section and all hooks sections closed and clamping thereon, forcing the points —2— into the belt material as is illustrated in Fig. 8 and forming a series of fixedly attached wire belt hooks projecting from the end of the belt section, having an opening therethrough at the curved end of the hook. A similar section —B— is attached to the opposite end of the belt —7— and placed thereon to position the wire hooks to alternately engage the space between the hooks in section —A— capable of inserting the curved ends of one section within the other a sufficient distance for inserting a locking pin —8— therein as shown in Figs. 7 and 8, thus providing a rigid strong construction for splicing the belt.

While the general arrangement and position of the individual belt hooks —1— and the means for connecting the two sections together by the insertion of a locking pin is admittedly old and known to the art, its application and use in my device as one of the elements of my construction and combination is deemed to be new and to which I lay claim to the combination. My invention resides in the combination as a whole, comprising a permanent rigid lacing section, capable of holding all hooks permanently in a fixed rigid position when applied to the belt.

By the use of the old form of separated belt hooks where the belt is applied over steel pulleys the hooks become badly worn at the hook end and often break, rendering the hook unoperative because of its separated attachment, while by the application of the special lacing bar to the hook members, as shown in my device, the lacing bar is fixedly and securely attached to each hook, producing a lacing section which will last much longer and operate more efficiently than the separated belt hooks now commonly in use and which require setting by special machinery. In case any hook in my section should be worn and broken at the hook end the hook is still operative and effective in resisting the strain of the belt because of its permanent attachment to the cross lacing. Further, it will be noted that the old separated belt hooks when applied to old belts, which become spongy and soft when used on machinery, subject to grease and oil, and that the hooks become loose and may be unoperative because of the resistance of each hook as applied, is independent of the other hooks. while in my special lacing section all hooks are held rigidly in a fixed position in the belt where the belt is soft and spongy, or of any soft material and any hook that is inserted within a soft spot in the belt and is without belt resistance, its proportionate load is readily distributed among the other hooks through the connecting lacing bar. This is also the case when my assembled section is improperly applied to the belt ends as may be the case when attached at an angle with the belt instead of properly connected thereto in a square position and the resistance to the improper connection by its cornerwise attachment would be equally distributed among all of the hooks, while in the case of the old type of lacing each hook being separated the whole eccentric load caused by the improper lacing would fall first upon one hook and which would carry the excess load until failure in either hook or belt supports, placing the same on the next adjacent hook, resulting in an uneffective result if not wholly a destructive application.

Having fully described my lacing hook, what I claim as my invention and desire to secure by Letters Patent, is, 1. A belt hook lacing adapted for splicing flexible belt sections together, comprising several wire belt hooks placed in parallel series and arranged with an intervening space between each hook wire, a metal lacing bar formed with a corrugated surface positioned within the series of hooks, along the inside of the hook arms and fixedly attached thereto in a manner to engage one hook wire within each corrugation and said metal lacing bar fixedly attached to all of the hook members for holding them in a fixed rigid section.

2. A belt hook lacing adapted for splicing flexible belt sections together, comprising a number of U-shaped standard wire belt hooks placed in a parallel series with each other and arranged with an intervening space between each of the wire hooks at least equal to the diameter of the belt hook wire, a metal lacing bar positioned along the under side of the wire hook arms, said lacing bar formed with deep corrugations therein positioned and arranged to engage a belt hook wire within each corrugation, and said corrugated lacing bar fixedly attached to all of the belt hooks for holding them in a rigid section, capable of being injected within a belt end as a splicing member and operating as a rigid lacing section.

3. A belt hook lacing adapted for splicing flexible belt sections, comprising a series of U-shaped standard wire belt hooks all arranged in a straight line and parallel with each other and positioned to provide an intervening space between each of the hook wires sufficient for inserting and interweaving an alternate section series of wire belt hooks therebetween, a corrugated metal lacing bar positioned along the under side of each arm of the series of belt hooks, said lacing bar having each corrugation positioned to engage an arm of one of the wire belt hooks, the corrugations being of a size and depth to nearly inclose the belt hook wire and clamp fixedly thereto and in a manner to hold all of said wire belt hooks in a fixed rigid section capable of being inserted in the end of a flexible belt and operate as a splicing member.

4. A belt hook lacing adapted for splicing flexible belt sections together, comprising a series of standard U-shaped wire belt hooks made with sharp pointed hook ends bent inwardly for clamping over and engaging the end of a belt section and providing a U-shaped end for receiving a locking pin therein, said hooks arranged parallel with each other and positioned with a space between the hooks sufficient to insert an alternate section series of wire belt hooks therebetween, a corrugated metal wire lacing bar placed along the under side of each of the series of arms of the wire belt hooks each corrugation of the lacing bar positioned to engage an arm of one of the wire hooks and nearly inclosing the wire in a manner for fixedly attaching thereto, said metal lacing bar being attached to all of the wire belt hooks for holding them straight in line and in a rigid section, capable of being clamped into the end of a flexible belt as a loop splicing member therefor.

5. In a belt hook lacing of the class described, a series of belt hooks arranged in spaced parallel relation and means for rigidly uniting said series of hooks comprising a lacing member formed with a plurality of spaced depressions engageable respectively with said hooks, said lacing member being secured in place by deforming the portions thereof between said depressions into embracing engagement with said hooks.

6. In a belt hook lacing of the class described, a series of belt hooks arranged in spaced parallel relation and means for rigidly uniting said series of hooks comprising a lacing member formed with a plurality of spaced loops engageable respectively with one arm of each of said hooks, the portions of said lacing bar between said loops being upset to cause said loops to rigidly embracingly engage said hook arms.

7. In a belt hook lacing of the class described, a plurality of belt hooks arranged in spaced parallel series and means for rigidly connecting said hooks comprising a lacing member formed with a plurality of depressions connected by oppositely extending loops, said series of hooks engaging respectively said depressions and secured therein by deforming said loops into rigid embracing engagement with said hooks.

In witness whereof, I sign these specifications.

Detroit, Mich. February 7, 1927.

VICTOR TOBOLLA.